United States Patent
Jarrett (10) Patent No.: US 8,087,061 B2
(45) Date of Patent: Dec. 27, 2011

(54) RESOURCE-REORDERED REMEDIATION OF MALWARE THREATS

(75) Inventor: Michael Sean Jarrett, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 12/111,371

(22) Filed: Apr. 29, 2008

(65) Prior Publication Data

US 2009/0044272 A1    Feb. 12, 2009

Related U.S. Application Data

(60) Provisional application No. 60/954,433, filed on Aug. 7, 2007.

(51) Int. Cl.
*H04L 29/06* (2006.01)
*G06F 11/07* (2006.01)

(52) U.S. Cl. .............. 726/1; 726/22; 726/25

(58) Field of Classification Search .......... 726/1, 14, 726/22–26; 713/154
See application file for complete search history.

(56) References Cited

U.S. PATENT DOCUMENTS

| | | | |
|---|---|---|---|
| 6,842,861 B1 | 1/2005 | Cox et al. | |
| 6,886,099 B1 * | 4/2005 | Smithson et al. | 726/24 |
| 2001/0037473 A1 * | 11/2001 | Matsuura et al. | 714/5 |
| 2002/0116639 A1 | 8/2002 | Chefalas et al. | |
| 2003/0093531 A1 * | 5/2003 | Yeung et al. | 709/226 |
| 2004/0250124 A1 * | 12/2004 | Chesla et al. | 713/201 |
| 2005/0193429 A1 * | 9/2005 | Demopoulos et al. | 726/23 |
| 2005/0262567 A1 | 11/2005 | Carmona | |
| 2006/0053490 A1 | 3/2006 | Herz et al. | |
| 2006/0075494 A1 | 4/2006 | Bertman et al. | |
| 2006/0130141 A1 | 6/2006 | Kramer et al. | |
| 2006/0179484 A1 * | 8/2006 | Scrimsher et al. | 726/23 |
| 2006/0218635 A1 * | 9/2006 | Kramer et al. | 726/22 |
| 2006/0265750 A1 * | 11/2006 | Huddleston | 726/24 |
| 2007/0143843 A1 | 6/2007 | Nason et al. | |
| 2007/0156696 A1 * | 7/2007 | Lim | 707/9 |
| 2007/0157315 A1 | 7/2007 | Moran | |
| 2007/0180528 A1 | 8/2007 | Kane | |

OTHER PUBLICATIONS

Learn about Windows Live OneCare. http://onecare.live.com/standard/en-us/prodinfo/default.htm. Last accessed Aug. 29, 2007.
Cleaning your Computer from Malware with the Microsoft Malware Removal Starter Kit. http://www.petri.co.il/microsoft-malware-removal-starter-kit.htm. Last updated Aug. 8, 2007.
SnapFiles. ZeroSpyware 2005. http://www.snapfiles.com/get/zerospyware.html. Last access Aug. 24, 2007.

* cited by examiner

*Primary Examiner* — Thanhnga Truong
*Assistant Examiner* — Justin T Darrow
(74) *Attorney, Agent, or Firm* — Workman Nydegger (57) ABSTRACT

Systems and methods that mitigate affects of malware and facilitate remediation processes. An analysis engine generates a list of actions for resources associated with the malware, and prioritizes/sorts the actions for execution. Such list of actions can be generated automatically via an action list generation component associated with the analysis engine. Likewise, a sorting component as part of the analysis engine can prioritize operations between detected malware to typically ensure a smooth operation during remediation processes (e.g., avoid conflicts).

16 Claims, 8 Drawing Sheets

RESOURCE-REORDERED REMEDIATION OF MALWARE THREATS

CROSS REFERENCE TO RELATED APPLICATIONS

This application claims the benefit of U.S. Provisional Application Ser. No. 60/954,433 entitled "RESOURCE-REORDERED REMEDIATION OF MALWARE THREATS" filed on 7 Aug. 2007. The entirety of this application is hereby incorporated herein by reference

BACKGROUND

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example.

Moreover, when developing an application, it is oftentimes difficult to predict how the application will react under real-world conditions. For example, it can be difficult to predict security vulnerabilities of an application prior to and during development and/or before completion. Frequently, upon completion, a developer will have to modify the application in order to adhere to real-world conditions and threats of attacks. Furthermore, designing for application security is oftentimes random and does not produce effective results. Consequently, applications and data associated therewith are left vulnerable to threats and uninvited attacks. Often, the typical software practitioner lacks the expertise to effectively predict vulnerabilities and associated attacks Likewise, exchange of data between system components can potentially create vulnerabilities with respect to malware (e.g., viruses) and other harmful agents. For example, programs such as spyware can readily eavesdrop on and/or monitor an individual's activity, and report back such activity to the entity that initiated and/or instantiated the spyware. Typically, spyware employs computer software that collects sensitive data, such as personal information (e.g., passwords, Personal Identification Numbers (PINs), Social Security information, bank account, credit card and other ancillary financial details, etc.) about individuals without their consent. Put differently, spyware includes software that monitors user behavior, or accumulates information about the user through an executable program, deployed without adequate notice, consent, or control for the user.

In general, malware can be considered as potentially unwanted technologies deployed without appropriate user consent and/or implemented in ways that impair user control over, for example, material changes that affect their experience, privacy, or system security; use of their system resources, including programs installed on their computers; and/or collection, use, and distribution of their personal or other sensitive information. Likewise, adware, programs that cause advertising content to be delivered and displayed potentially in a manner or context that can be unexpected or unwanted by users, has also become a prevalent feature of the modern computing experience. Many adware applications, in addition to causing advertising content to unexpected be displayed, can also include tracking functionalities similar to those common in spyware.

To prevent such undesirable and destructive agents, in-process or 'in-proc' scanning software is most often employed to cleanse documents that are both uploaded and downloaded during a conference. Accordingly, anti-malware products such as anti-spyware products can scan machines to identify a 'threat', which is a grouping of objects detected on the target system related to an instance of malware—(each object, such as a file, registry key, process, or other system object, can be referred to as a 'resource'). Often, multiple threats can exist on a machine that has been infected by malware, and the resources associated therewith may also be shared across multiple threats (or otherwise depend on resources in other threats or the same threat.) As such, an action performed on one resource can have unintended consequences on another resource (or the same resource in another threat). Such can complicate remediation processes, and cause failure or unexpected results such as data loss for the user.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation mitigates affects of malware and facilitates remediation processes via an analysis engine, which generates a list of actions for resources associated with the malware, and prioritizes/sorts the actions for execution. Such list of actions (e.g., "remove", "quarantine", "clean", and the like) can be generated automatically via an action list generation component associated with the analysis engine, and can further employ user input to designate a respective action that is required for each resource. Likewise a sorting component as part of the analysis engine can prioritize operations between detected malware (e.g., reordering across plurality of malware threats) to typically ensure a smooth operation during remediation processes (e.g., "backup" action occurring before a "remove action"; and/or to avoid conflicts). Hence, if a resource is shared among malware and one action requires "ignore", and another action requires "delete", the proper action during such conflict can be selected based on a predetermined priority and/or a calculated priority criteria.

As such, malware and related threats are transformed to action lists, wherein each threat and its related resources are identified. Such actions can then be executed based on a priority to reduce potential conflicts and perform remediation processes in an ordered manner (as opposed to a random operation), to improve efficiency. Accordingly, malware can be removed via operations that are not necessarily customized for removal of such detected malware (e.g., a predetermined program specific to removal of the malware).

In a related aspect, the sorting component of the subject innovation can prioritize actions to be performed for each resource, based on criteria such as: type of action; type of resource; dependencies among resources; location of resources (e.g., removal of child folders before parent folders); and the like. Moreover, upon execution of the actions based on such priority, feed back can be supplied to the analysis engine for evaluating result of the actions—such as actions' success or failure (e.g., due to a locked file). Based on such evaluation, the analysis engine can recommend further remedial actions.

According to a methodology of the subject innovation, initially a scan can be performed on target machines to detect malware thereupon. Subsequently, a user (or a program) can designate actions that are required for the detected malware (e.g., quarantine, remove, clean and the like). Accordingly, list of actions are generated, which are to be performed on malware and associated objects/resources (e.g., infected on the target machine). Examples of such actions related to the remediation process can include: "ignore", "quarantine" (make backup/copy and remove), "remove" (delete), "clean" (keep in place and remove threat by disabling dangerous components), and the like. Subsequently, the action list can further be examined to verify whether resources associated with the malware occur in several threats, and hence order the acts for proper performance of the operation. Moreover for each resource type, actions that are to be performed thereon can be prioritized based on predetermined settings (e.g., if program A is being protected by Program B, the ordering of the subject innovation removes program B before removing program A.) Likewise, if a resource is to be deleted as a result of an action, and to be modified due to another action; a most important action based on a predetermined and/or calculated importance criteria can trump the other actions requested on such resource. Additionally, if other operation such as execution of specialty programs before facing the threats are identified (e.g., identified via related signatures that contain information about malware threats), such specialty programs can further be considered during the prioritizing acts.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
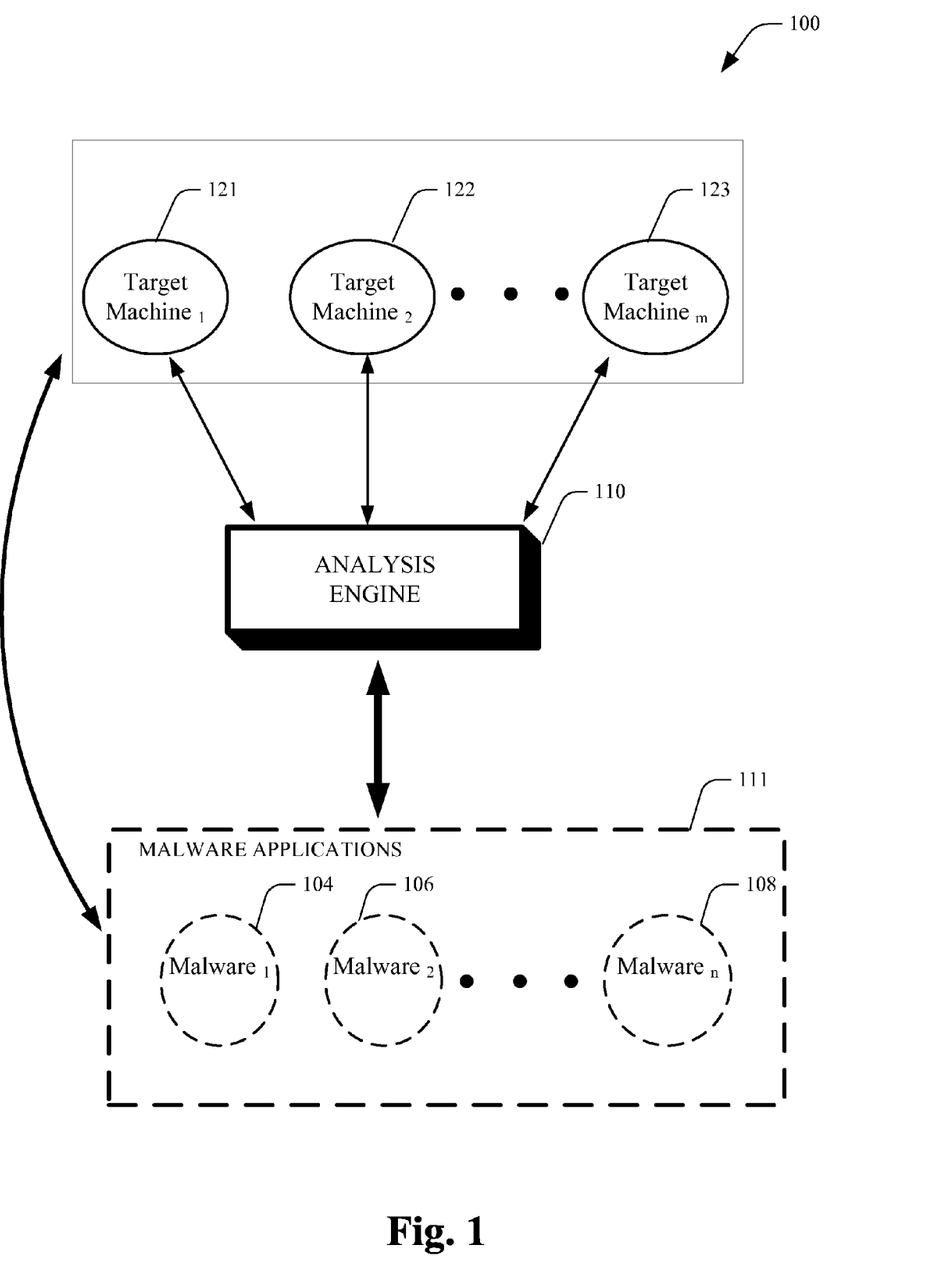
FIG. 1 illustrates a block diagram of an exemplary analysis engine that facilitates remediation processes in accordance with an aspect of the subject innovation.

FIG. 1 illustrates a block diagram of a system 100 that mitigates affects of malware and facilitates remediation processes via an analysis engine 110. Such analysis engine 110 can generate a list of actions for resources associated with the malware 111, and prioritizes/sorts the actions for execution. The malware 111 can include a plurality of segments 104, 106, 108 (1 thru n, n being an integer) that can be distributed in target machines 121, 122, 123 (1 thru m, m being an integer). Such target machines 121, 122, 123 can include devices that are part of a network (e.g., wireless network) such as a system area network or other type of network, and can include several hosts, (not shown), which can be personal computers, servers or other types of computers. Such hosts generally can be capable of running or executing one or more application-level (or user-level) programs, as well as initiating an I/O request (e.g., I/O reads or writes). In addition, the network can be, for example, an Ethernet LAN, a token ring LAN, or other LAN, or a Wide Area Network (WAN). Moreover, such network can also include hardwired and/or optical and/or wireless connection paths.

Malware and related threats on such target machines 121, 122, 123 are transformed to action lists, wherein each threat and its related resources are identified. Such actions can then be executed based on a priority to reduce potential conflicts and perform remediation processes in an ordered manner (as opposed to a random operation), to improve efficiency. Accordingly, malware 104, 106, 108 can be removed via operations that are not necessarily customized for removal of such detected malware (e.g., a predetermined program specific to removal of the malware).

Figure 2:
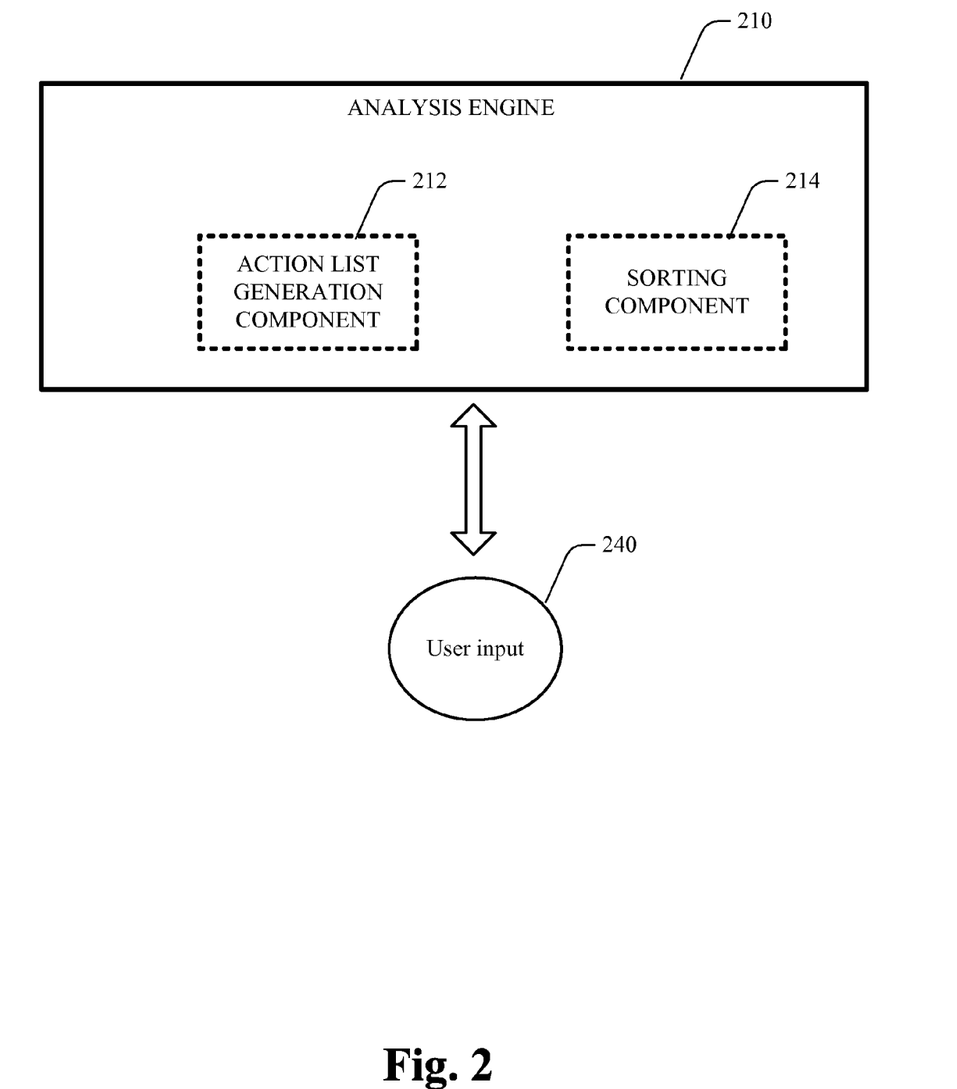
FIG. 2 illustrates a particular block diagram of the analysis engine that includes a sorting component and an action list generation component according to an aspect of the subject innovation.

For example, to remove a malware 104, 106, 108 from the target machines 121, 122, 123 a list of actions for each resource associated with such malware can be determined, and prioritized. Hence, if a resource is shared among malware and one action requires "ignore", and another action requires "delete", the proper action during such conflict can be selected based on a predetermined priority and/or a calculated priority criteria. Moreover, the connections between target machines 121, 122, 123 can be shared by the analysis engine 110. Different actions for each resource associated can be prioritized, within the network target machines. It is to be appreciated that such network can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. It is to be appreciated that the wireless communication network can be cellular or WLAN communication network; such as Global System for Mobile communication (GSM) networks, Universal Mobile Telecommunication System (UMTS) networks, and wireless Internet Protocol (IP) networks such as Voice over Internet Protocol (VoIP) and IP Data networks FIG. 2 illustrates an analysis engine 210 that includes an action list generation component 212 and sorting component 214. The list of actions (e.g., "remove", "quarantine", "clean", and the like) can be generated automatically via the action list generation component 212 associated with the analysis engine 210, and/or can further employ user input 240 to designate a respective action that is required for each resource. Likewise the sorting component 214 as part of the analysis engine 210 can prioritize operations between detected malware (e.g., reordering across plurality of malware threats) to typically ensure a smooth operation during remediation processes (e.g., avoid conflicts).

Figure 3:
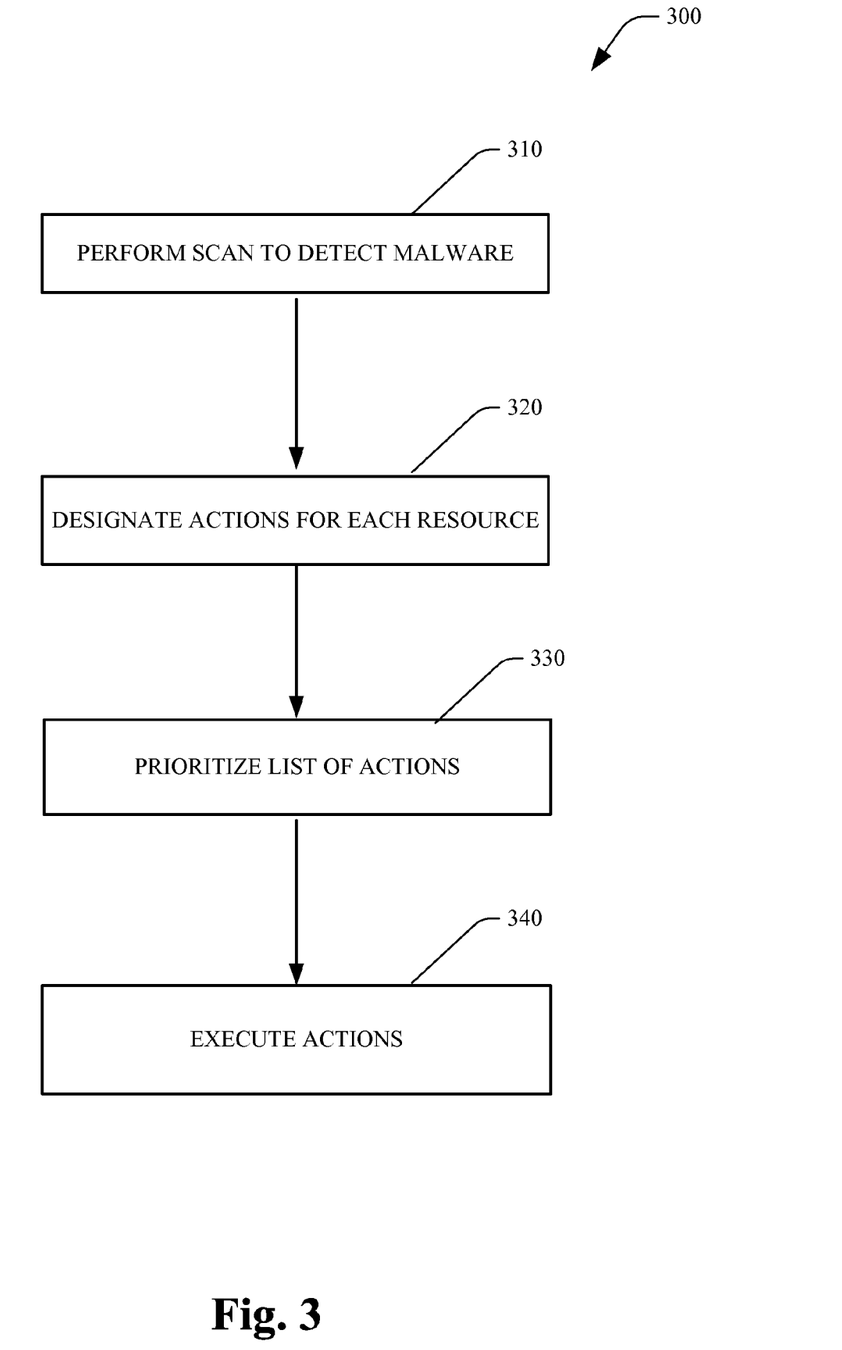
FIG. 3 illustrates a related methodology of remediation for malware in accordance with an aspect of the subject innovation.

FIG. 3 illustrates a related methodology 300 for malware removal and remediation process in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 310 a scan can be performed on target machines to detect malware thereupon. Subsequently, and at 320 a user (or a program) can designate actions that are required for the detected malware (e.g., quarantine, remove, clear and the like). Accordingly, list of actions are generated, which are to be performed on malware and associated objects/resources (e.g., infected on the target machine). Examples of such actions related to the remediation process can include: "ignore", "quarantine" (make backup and remove), "remove" (delete), "clean" (keep in place and remove threat by disabling dangerous components), and the like. Subsequently, the action list can further be examined to verify whether resources associated with the malware occur in several threats, and hence order the acts for proper performance of the operation. Moreover, and at 330 for each resource type, actions that are to be performed thereon can be prioritized based on predetermined settings (e.g., if program A is being protected by Program B, the ordering of the subject innovation removes program B before removing program A.) Likewise, if a resource is to be deleted as a result of an action, and to be modified due to another action; a most important action based on a predetermined and/or calculated importance criteria can trump the other actions requested on such resource. Additionally, if other operation such as execution of specialty programs before facing the threats are identified (e.g., identified via related signatures), such specialty programs can further be considered during the prioritizing acts. At 340, the prioritize set of actions can be executed.

Figure 4:
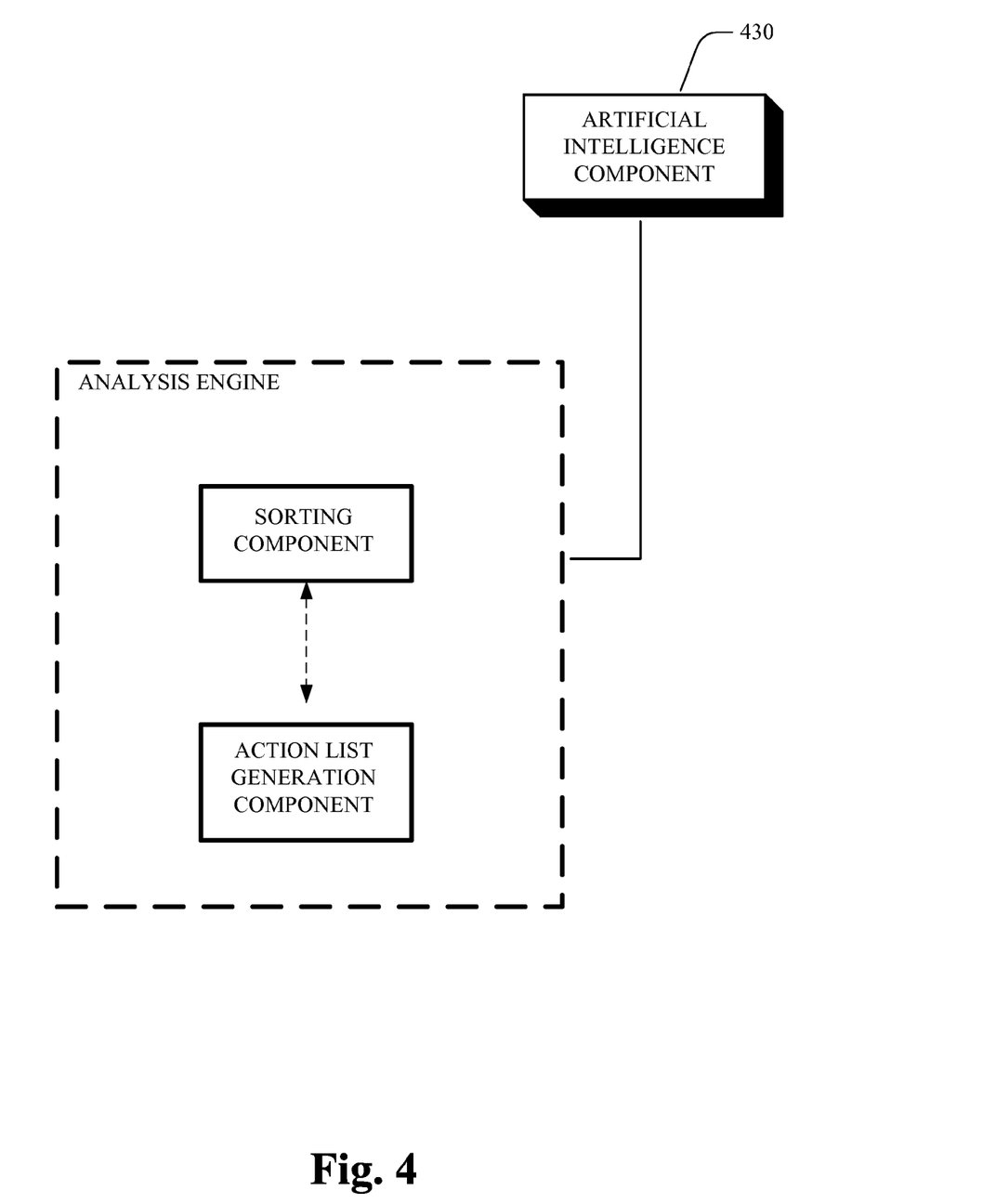
FIG. 4 illustrates an artificial intelligence component associated with the analysis engine of the subject innovation.

FIG. 4 illustrates an artificial intelligence (AI) component 430 that can be employed to facilitate inferring and/or determining when, where, how to determine an action in conjunction with a resource for removal of malware. For example, such artificial intelligence component 430 can supply additional analysis on the list to perform optimizations or conflict resolution by editing/modifying the list, to increase the probability that remediation actions are successful.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 430 can employ any of a variety of suitable AI-based schemes as described supra in connection with facilitating various aspects of the herein described invention. For example, a process for learning explicitly or implicitly how or what activity the user has been engaged in can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

In a related aspect, a process in accordance with an aspect of the subject innovation can include the various acts of:

---

Action Queue:AQ
Threat Handler Queue: HQ
For each Threat:T in Threat Manager
   HQ += new Threat Handler(T):H
   AQ += Create Actions List (H)
Sort (AQ)
For each Action:A in AQ
   H <- Get Handler (A)
   If H Is Finished (Reverted/Committed)
     Skip Action
   Activate Threat Handler (H)
   Execute Action (A)
   If H Cannot Continue
     Rollback (H)
   If H Has Completed All Actions
     Commit (H)

---

Likewise, action priorities that can be employed for a level of sorting can include:

Ignore:
Exclusively for no-op actions used in "ignore". Such typically ensures that ignored threats are closed out expediently.
Start Script:
Execute any pre-clean scripts for all threats.

Service Query:
Used for service termination—we record and then clear the service failure actions here, to prevent the Windows Service Control Manager from taking remedial service recovery actions against processes we kill.

Kill Processes:
Processes are suspended and then killed as a group, to prevent interference with the removal process.

Quarantine:
Resources for all threats are quarantined, before any removal is performed.

Removal/Clean:
The primary removal/clean process on individual resources.

Re-Removal:
A secondary removal phase used by quarantine for when clean operations fail for a threat.

Container Commit:
Finish any quarantine opened during removal for operations on container resources.

End Script:
Execute any post-clean scripts for all threats.

The following describe various examples according to an aspect of the subject innovation.

Example—Priority by Action Type

The anti-malware product detects two malware: EvilInfector and BadProgram. BadProgram's process (BadProcess, from BadProgram.exe) has opened ImportantStuff.doc, a user's important document, which is infected with EvilInfector. The user has asked the anti-malware product to quarantine both BadProgram and EvilInfector.

One naïve approach is to just act on both threats in order.

| 1. | Backup | ImportantStuff.doc |
| 2. | Delete | ImportantStuff.doc |
| 3. | Backup | BadProgram.exe |
| 4. | Delete | BadProgram.exe |
| 5. | Stop | BadProcess |

However, such approach can fail, as the continued execution of BadProcess will prevent the backup or delete of both ImportantStuff.doc and BadProgram.exe. Resource-reordered remediation of the subject innovation can explicitly reorder such actions, supplying higher priority to stop over backup, and backup over delete.

| 1. | Stop | BadProcess |
| 2. | Backup | ImportantStuff.doc |
| 3. | Backup | BadProgram.exe |
| 4. | Delete | ImportantStuff.doc |
| 5. | Delete | BadProgram.exe |

In this case, the process can be stopped before the backups and deletes are performed, and the actions are successful.

Example—Priority by Resource Dependency

In this case, three malwares can be detected namely: DubiousProgram, BadPlugin (an add-on for DubiousProgram), and BadInfector (a file-infector associated with BadPlugin).

The file layout can be represented by.

| C:\Program Files\DubiousProgram | [detected: DubiousProgram] |
| Dubious.exe | [detected: DubiousProgram] |
| DubiousUpgrade.dll | [detected: DubiousProgram, BadPlugin] |
| BadPlugin.dll | [detected: BadPlugin] |
| BadPluginFiles\ | [detected: BadPlugin] |
| MoreImportantStuff.doc | [detected: BadInfector, BadPlugin] |

The user can decide not to disapprove DubiousProgram, and hence choose to ignore it. Such user can further wish to remove BadPlugin completely, and quarantine BadInfector, which has infected MoreImportantStuff.doc. A naïve approach is to act on each threat in order.

| 1. | Ignore | DubiousProgram\ |
| 2. | Ignore | Dubious.exe |
| 3. | Ignore | DubiousUpgrade.dll |
| 4. | Delete | DubiousUpgrade.dll |
| 5. | Delete | BadPlugin.dll |
| 6. | Delete | BadPluginFiles\ |
| 7. | Delete | MoreImportantStuff.doc |
| 8. | Backup | MoreImportantStuff.doc |
| 9. | Delete | MoreImportantStuff.doc |

With resource-reordered remediation, one can observe that the ignore actions are irrelevant, and that DubiousUpgrade.dll has conflicting actions, so one can chose not to act thereupon. Such further curtails the action list to four remaining actions. Moreover, one can further observe that backup should be performed for MoreImportantStuff.doc before deleting it or its parent directory. Hence, the new ordering is represented by:

| 1. | Backup | MoreImportantStuff.doc |
| 2. | Delete | BadPlugin.dll |
| 3. | Delete | MoreImportantStuff.doc |
| 4. | Delete | BadPluginFiles\ |

Figure 5:
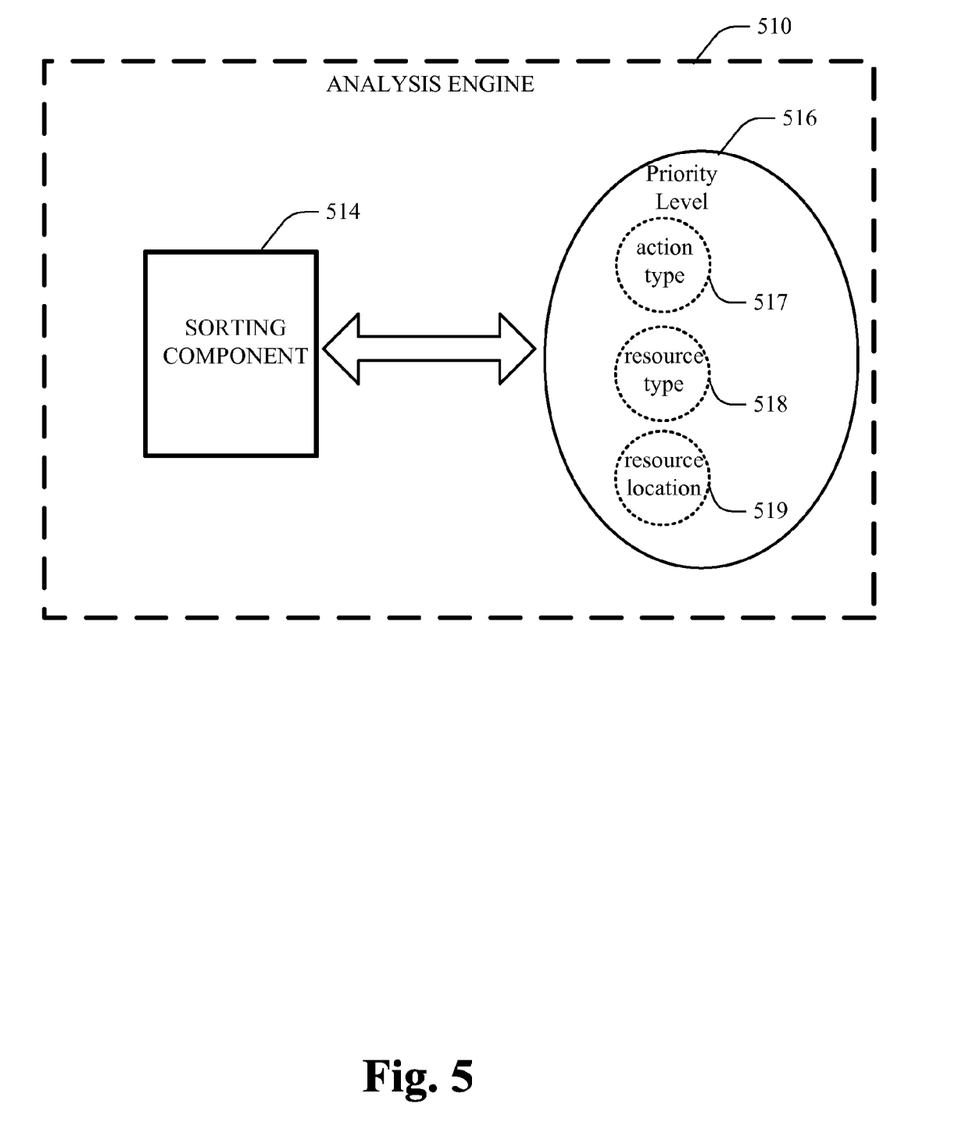
FIG. 5 illustrates an exemplary interaction between a sorting component and priority levels according to an aspect of the subject innovation.

FIG. 5 illustrates a block diagram for an analysis engine 510 according to an aspect of the subject innovation. The sorting component 514 can sort actions based on a priority level, wherein such priority level includes action types 517; resource type 518 and resource location 519. Moreover, discrete actions can be reordered by using a priority-based system to prevent conflicts.

For example, inputs to a process are the list of threats, T, wherein each threat $t \in T$ can have an associated set of resources $r_q \in R_t$, and an associated action $a_t \in A$. The action $a_t$ can represent the user's intent with regards to malware. For example, one aspect of the subject innovation can provide choices such as 'Quarantine' (make a copy of the threat t, then delete it from the running system), 'Clean' (disarm t in place, and leave all references to it in place), 'Remove' (delete t and all references to it), and 'Ignore' (do not take action on t).

The first step of actions processing to generate the set Q=P(T,A), wherein Q is the set of individual actions to take on resources, oil $q_i \in Q$. $P_a(q_i)$, $P_b(q_{iB})$, $P_a(q_t)$ represent three distinct priorities for each action $q_i$. Moreover, $P_a(q_i)$ is the 'action priority'. It establishes the relative ordering of broad action types which have interdependencies. For example, that a 'stop' action (against a process) take priority over any 'backup' action, and backup should always happen before deletes.

$P_b(q_i)$ is the 'resource type priority'. Where the main priority is otherwise equal, these define certain resources which should be acted on before others. For example, for a list of 'delete' actions, one should delete files before folders.

$P_a(q_i)$ is the 'resource location priority'. For actions with equal action priority and resource type priority, the resource location priority returns a string representing the resource. Moreover, one can perform a string comparison to ensure that resources are removed in a predictable order, and to ensure parent-child relationships are observed. For example, the folder C:\a\b\c should typically be deleted before the folder C:\a\b.

One can further define a total ordering on Q, by using the following formula. Such ordering is used to sort the list of actions.

$$\leq (q_a, q_b), P_a(q_a) < P_a(q_b)$$
$$\vee (P_a(q_a) = P_a(q_b)^{\wedge} (P_b(q_a) < P_b(q_b) \vee (P_b(q_b) = P_b$$
$$(q_b)^{\wedge} \leq (P_c(q_a), P_c(q_c)))))$$

The next act is to execute list of actions, in their sorted order. One by one, the actions are processed, and the results integrated into the threat data. Once all actions are complete, the final result is recorded for each threat.

Figure 6:
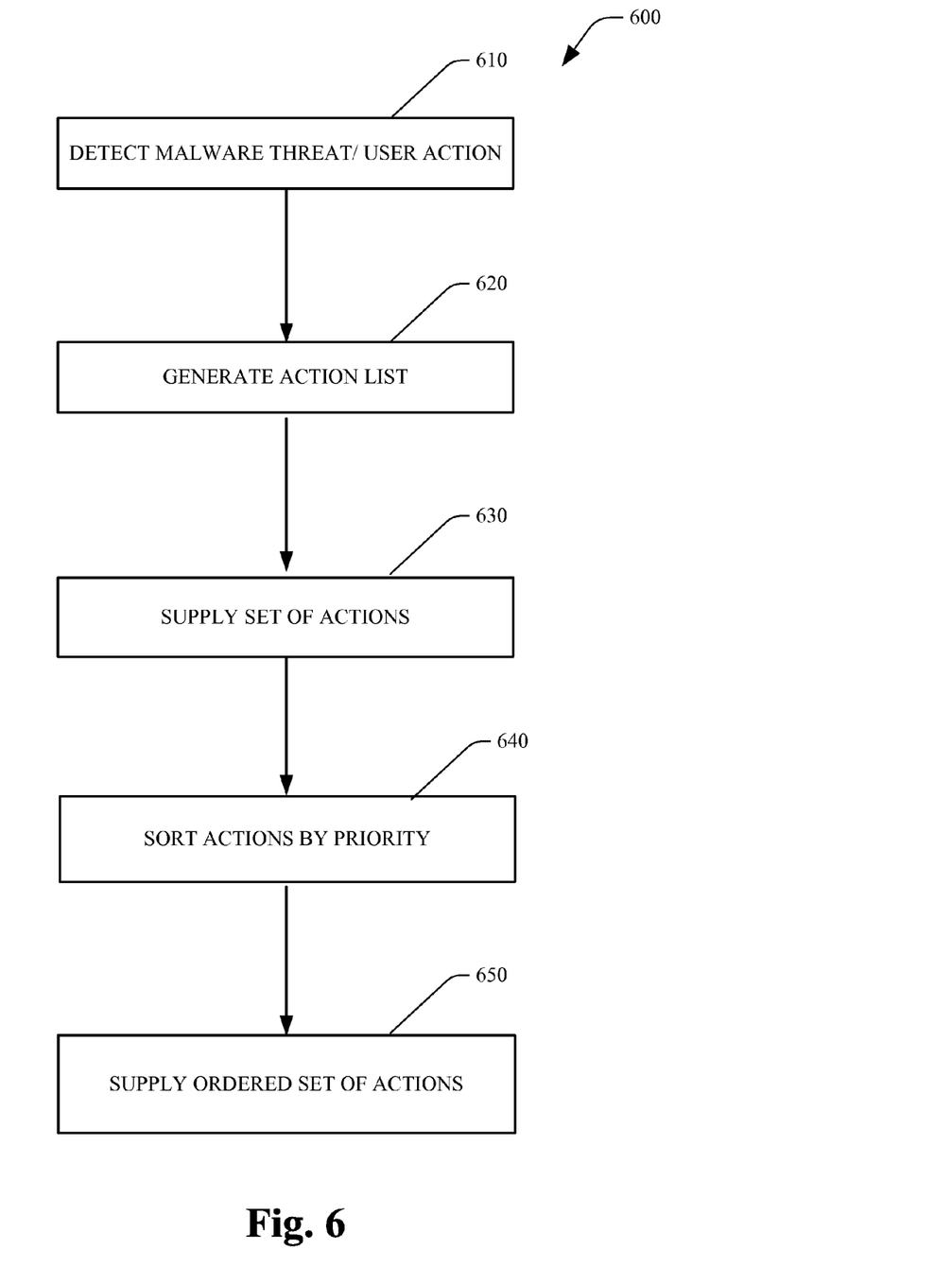
FIG. 6 illustrates a further methodology of malware detection according to a further aspect of the subject innovation.

FIG. 6 illustrates a related methodology 600 of remediation processes according to a further aspect of the subject innovation. Initially, in response to user action and/or malware detection at 610, the subject innovation generates a set of actions at 620 for resources. Next and at 630 such list of actions for resources associated with the malware can be supplied to the system. Subsequently and at 640 actions can be sorted by priority to supply ordered set at 650. As such, malware and related threats are transformed to action lists, wherein each threat and its related resources are identified. Such actions can then be executed based on a priority to reduce potential conflicts and perform remediation processes in an ordered manner (as opposed to a random operation), to improve efficiency. Accordingly, malware can be removed via operations that are not necessarily customized for removal of such detected malware (e.g., a predetermined program specific to removal of the malware).

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 7:
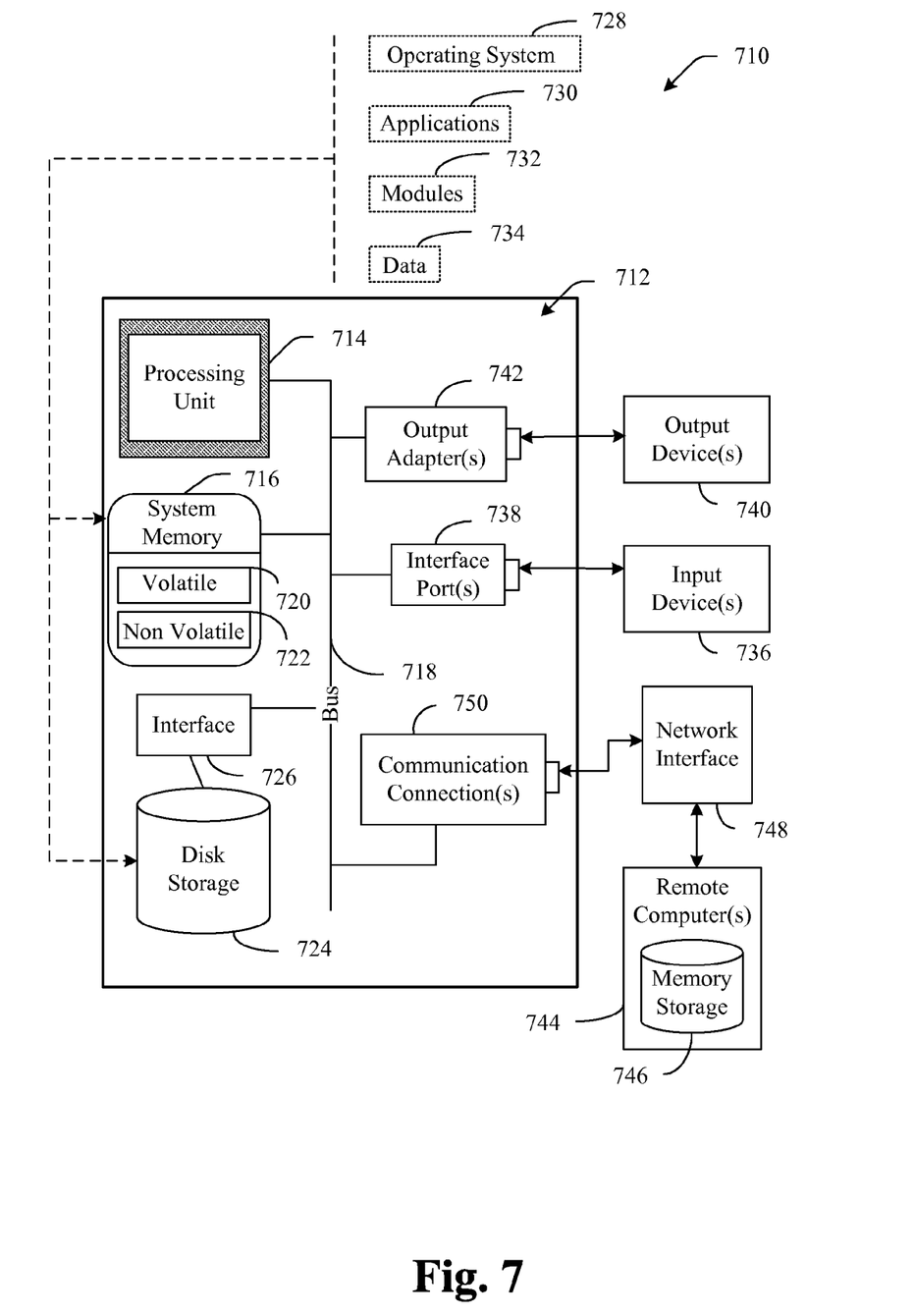
FIG. 7 illustrates an exemplary environment for implementing various aspects of the subject innovation.
Figure 8:
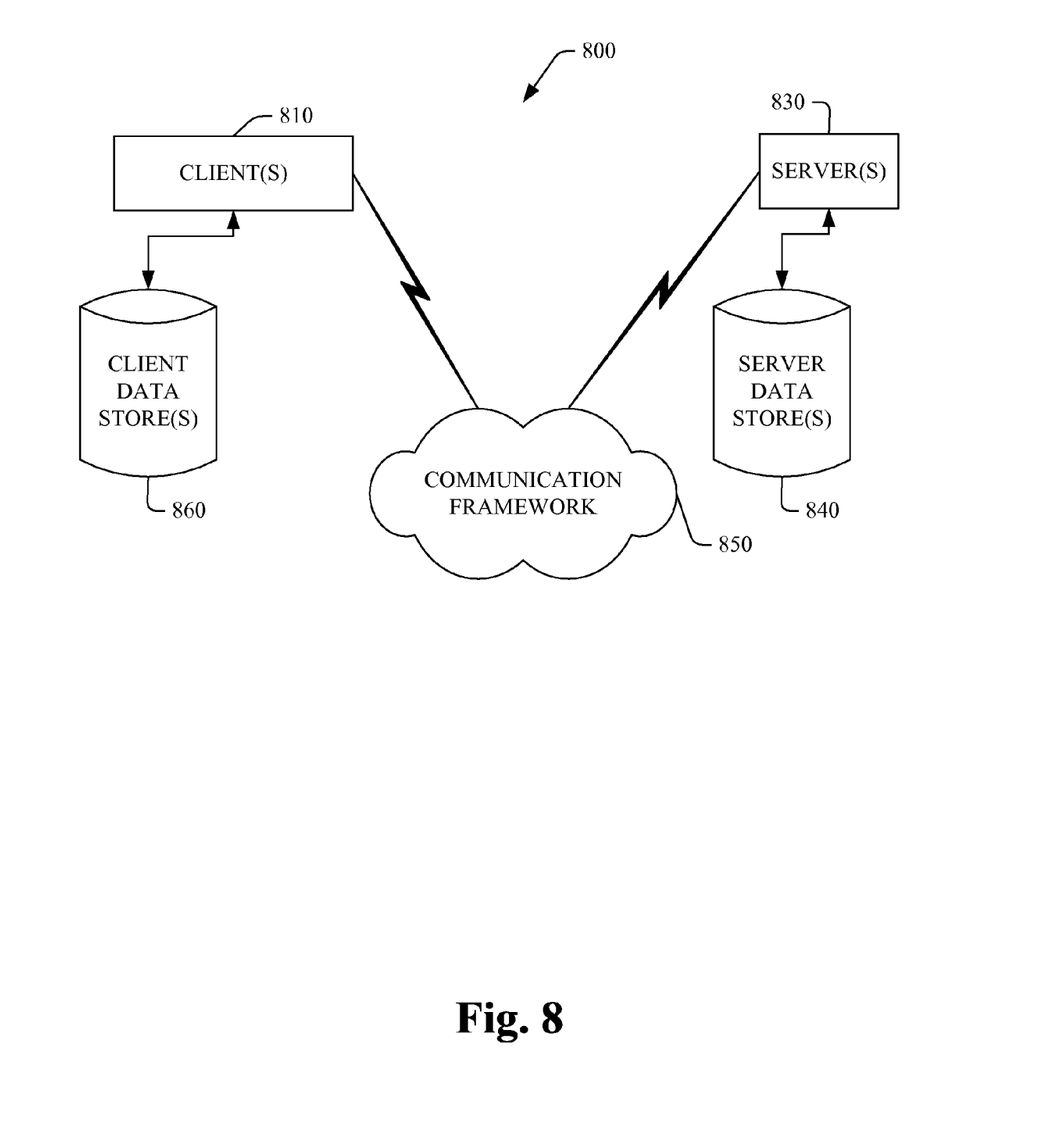
FIG. 8 is a schematic block diagram of a sample-computing environment that can be employed for remediation processes of the subject innovation.

In order to provide a context for the various aspects of the disclosed subject matter, FIGS. 7 and 8 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules.

As used in this application, the terms "component", "system", "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 7, an exemplary environment 710 for implementing various aspects of the subject innovation is described that includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/non-removable, volatile/non-volatile computer storage media. FIG. 7 illustrates a disk storage 724, wherein such disk storage 724 includes, but is not limited to, devices like a magnetic disk drive, floppy disk drive, tape drive, Jaz drive, Zip drive, LS-60 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that various components described herein can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

FIG. 8 is a schematic block diagram of a sample-computing environment 800 that can be employed for inferring user activity based on routing data and other contextual information. The system 800 includes one or more client(s) 810. The client(s) 810 can be hardware and/or software (e.g., threads, processes, computing devices). The system 800 also includes one or more server(s) 830. The server(s) 830 can also be hardware and/or software (e.g., threads, processes, computing devices). The servers 830 can house threads to perform transformations by employing the components described herein, for example. One possible communication between a client 810 and a server 830 may be in the form of a data packet adapted to be transmitted between two or more computer processes. The system 800 includes a communication framework 850 that can be employed to facilitate communications between the client(s) 810 and the server(s) 830. The client(s) 810 are operatively connected to one or more client data store(s) 860 that can be employed to store information local to the client(s) 810. Similarly, the server(s) 830 are operatively connected to one or more server data store(s) 840 that can be employed to store information local to the servers 830.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method, which is implemented by a computing system having one or more processors, the method comprising the computing system performing the following:
  scanning one or more target computing systems for malware threats;

identifying a plurality of different malware threats on the one or more target computing systems;

generating an initial list of actions to be performed on the malware threats, the initial list of actions being directed at mitigating affects of the malware threats, the generated list of actions being ordered in a first ordering associated with a first sequence for performing the list of actions;

prioritizing and reordering the list of actions into a second ordering associated with a second sequence for performing the list of actions, the second ordering being different than the first ordering, the prioritizing and reordering of the list of action items being based on predetermined settings that specify a plurality of different prioritizing rules for action type, as well as resource type, as well as for resource location, with the reordering being performed according to a prioritization hierarchy that includes a first ordering process that orders the list of actions based on an action type prioritization and that includes at least one additional ordering process which subsequently orders the list of actions based on at least one of a resource location prioritization or a resource type prioritization; and performing the reordered list of actions in the second sequence defined by the second ordering.

2. The method recited in claim 1, wherein the method further includes obtaining feedback regarding a success or a failure of at least one of the actions.

3. The method recited in claim 2, wherein the method further includes identifying an additional remedial action to perform in response to the feedback.

4. The method recited in claim 1, wherein the malware threats include at least one malware program designed to affect a resource of the computing system.

5. The method recited in claim 1, wherein the malware threats include at least one resource of the computing system that is affected by a malware program.

6. The method recited in claim 1, wherein prioritizing and reordering of the list of actions is based on action type.

7. The method recited in claim 1, wherein prioritizing and reordering of the list of actions is based on resource type, the resource type corresponding to one or more resources affected by the actions.

8. The method recited in claim 1, wherein prioritizing and reordering of the list of actions is based on determined resource relationships of one or more resources affected by the actions.

9. The method recited in claim 1, wherein prioritizing and reordering of the list of actions is based on a determined resource location of one or more resources affected by the actions.

10. The method recited in claim 1, wherein the actions includes an ignore action, a quarantine action, a remove action and a clean action.

11. The method recited in claim 1, wherein the reordering of the list of actions includes placing a stop action ahead of a backup action.

12. The method recited in claim 1, wherein the reordering of the list of actions includes placing a backup action ahead of a delete action.

13. The method recited in claim 1, wherein the reordering of the list of actions includes placing a delete child resource action ahead of a delete parent resource action, the child resource being a child of the parent resource.

14. The method recited in claim 1, wherein the reordering of the list of actions includes placing a delete file action ahead of a delete folder action.

15. A storage device having stored instructions which, when executed by at least one processor of a computing system, implement a method that includes the following:

scanning one or more target computing systems for malware threats;

identifying a plurality of different malware threats on the one or more target computing systems;

generating a list of actions to be performed on the malware threats, the list of actions being directed at mitigating affects of the malware threats, the generated list of actions being ordered in a first ordering associated with a first sequence for performing the list of actions;

re-sorting the list of actions into a second ordering associated with a second sequence for performing the list of actions, the second ordering being different than the first ordering, wherein the re-sorting is performed according to a hierarchy of ordering processes, including a first ordering process that orders the list of actions based on action priority and that subsequently orders the list of actions based on a resource type priority and a resource location priority, with the action based ordering process taking precedence over the second ordering process; and performing the reordered list of actions in the second sequence defined by the second ordering by applying the action priority followed by the resource type and resource location priorities.

16. A computing system comprising:

at least one processor; and at least one storage device having stored instructions which, when executed by the at least one processor, implement a method that includes the following:

scanning one or more target computing systems for malware threats;

identifying a plurality of different malware threats on the one or more target computing systems;

generating a list of actions to be performed on the malware threats, the list of actions being directed at mitigating affects of the malware threats, the generated list of actions being ordered in a first ordering associated with a first sequence for performing the list of actions; and performing the list of actions in a different order sequence than the first sequence defined by the first ordering, after reordering the list of actions into a second sequence defined by the reordering, wherein the reordering is performed by first sorting the list of actions based on priority based on action type, then sorting the list of actions based on priority based on resource type, then sorting the list of actions based on priority based on resource location.

* * * * *